United States Patent
Pawloski et al.

[15] 3,700,735
[45] *Oct. 24, 1972

[54] METHYLACETYLENE CHLORINATION

[72] Inventors: Chester E. Pawloski, Bay City; Russell L. Stewart, Midland, both of Mich.

[73] Assignee: The Dow Chemical Company, Midland, Mich.

[ * ] Notice: The portion of the term of this patent subsequent to May 16, 1989, has been disclaimed.

[22] Filed: April 22, 1968

[21] Appl. No.: 723,242

[52] U.S. Cl. ................................260/597 R
[51] Int. Cl. ...............................C07c 45/06
[58] Field of Search ...........260/597 R, 593 A, 597

[56] References Cited

UNITED STATES PATENTS 2,060,086  11/1936  Kautter......................260/597
1,953,499  4/1934  Pohl..........................260/597
2,856,430  10/1958  Elam..........................260/597

FOREIGN PATENTS OR APPLICATIONS 461,080  2/1937  Great Britain.............260/597

OTHER PUBLICATIONS

Whitmore, " Organic Chemistry" page 54– 55 and 66– 67.
Halpern et al., " J. Amer. Chem. Soc." Vol. 38, 1961, pp. 4097– 4098.

*Primary Examiner*—Bernard Helfin
*Assistant Examiner*—W. B. Lone
*Attorney*—Griswold and Burdick and C. E. Rehberg

[57] ABSTRACT

1,1-Dichloro-2-propanone is produced by a process comprising reacting by contacting methylacetylene with chlorine in the presence of water, preferably at a temperature between 50° and 105° C. The product is biologically active.

7 Claims, No Drawings

METHYLACETYLENE CHLORINATION

BACKGROUND OF THE INVENTION

It is known that the reaction of excess allene with hypochlorous acid in the presence of a large amount of water (e.g. 90 percent by volume) at a preferred temperature between 0° and 20° C. yields monochloroacetone. See U.S. Pat. No. 2,856,430.

SUMMARY OF THE INVENTION

It has now been found that 1,1-dichloro-2-propanone is produced by a process comprising reacting by contacting methylacetylene with chlorine in the presence of water.

In order to practice this invention, methylacetylene and chlorine are reacted by contact, in any convenient manner, in the presence of water, preferably at a temperature between 50° and 105° C. A preferred method of conducting the reaction is the continuous method wherein water is fed into the upper portion of a vertical column reactor while chlorine and methylacetylene are fed into the lower portion, thus effecting a countercurrent liquid-gas contact reactor. In this method, it is preferred to introduce methylacetylene into the reactor at a point lower than the chlorine addition, but this is not critical and the reactants can be introduced at approximately the same point along the reactor or chlorine can be introduced at a point lower than methylacetylene. Of course, a batch process can also be employed, e.g., water is held in a reaction vessel and methylacetylene and chlorine are introduced therein. The desired product of the reaction, i.e. 1,1-dichloro-2-propanone, is separated from the reaction mixture by conventional methods, e.g., condensation, distillation and/or decantation.

Although the amount of reactants used in this process can be varied widely, the molar ratio of chlorine to methylacetylene is preferably at least one to one. Most preferably, methylacetylene and chlorine are reacted in equimolar amounts. The amount of water employed in this process can also be varied widely.

The temperature used in this process is suitably between 50° and 105° C. and preferably between 70° and 105° C. Most preferably, this temperature is around 100° C. The pressure employed can be subatmospheric, atmospheric or superatmospheric, but it is preferred to use pressures of at least 1 atmosphere.

The production of 1,1-dichloro-2-propanone from methylacetylene by chlorination occurs not only when pure methylacetylene is introduced into the reaction vessel, but also when methylacetylene-containing gaseous hydrocarbon mixtures are chlorinated by this process. For example, methylacetylene in mixture with any one or a combination of any two or more of (1) acetylenics such as acetylene, 1-butyne and other acetylenics having up to five carbon atoms, (2) olefinics such as ethylene, propylene, n-butene, cyclobutene, isobutene, butadiene, allene and other olefins having up to eight carbon atoms, and (3) alkanes such as methane, ethane, propane, isobutane, n-butane and other alkanes having up to eight carbon atoms, is chlorinated by this process to produce 1,1-dichloro-2-propanone.

The 1,1-dichloro-2-propanone product of this reaction has biological activity. For example, it is entomologically active. Specifically, 7 mg. of adult confused flour beetle was placed in a perforated cage which, in turn, was placed in a 25.5 liter vault. Air was drawn across the vault and maintained for 16 hours at 80° F. with 1,1-dichloro-2-propanone injected into the entering air stream so that one pound of 1,1-dichloro2-propanone per 1000 cubic feet of air was present. After 16 hours, 100 percent kill of adult confused flour beetle was observed.

DESCRIPTION OF SPECIFIC EMBODIMENT

EXAMPLE 1

Using a 600 ml. pot reactor equipped with a stirrer, heating coil, pressure release valve and inlet and exit ports, 500 ml. of $H_2O$ was placed in the reactor and heated to 100° C. by steam in the heating coil of the reactor. Methylacetylene (1 g. per minute) and chlorine (1.8 g. per minute) were then introduced into the reactor so that they were reacted, with stirring, in the aqueous medium. After 2 hours, the run was completed and a total of 120 g. of methylacetylene and 213 g. of chlorine had been added to the reactor. During the run, the water temperature varied between 97° and 102° C. while the pressure within the reactor was between 7.5 and 10.0 psig. Water was added throughout the run so that the water level remained essentially constant. The vaporous product leaving the reactor during the run was collected, condensed and combined with the liquid product phase remaining in the reactor and the resulting mixture, 177 g., distilled to give 40.7 g. of 1,1-dichloro-2-propanone. This represents a 10.7 percent yield of 1,1-dichloro2-propanone based on methylacetylene fed to the reactor.

EXAMPLE 2

Using a 4 foot by 2 inch I.D. vertical reactor equipped with a water jacket, pressure regulator and inlet and exit ports, 686 g. of chlorine (9.72 moles) was added to the reactor at a rate of 0.036 mole per minute while 417 g. of a mixture containing 34 percent of methylacetylene and 34 percent of allene, by weight, the remainder being mostly propane, was added at a rate of 0.038 mole per minute so that they reacted in an aqueous medium. The water within the reactor (2415 ml. initially, 750 ml. more were added during the reaction) was at a temperature between 70° and 95° C. while the pressure within the reactor was at 14 psig. The vaporous product was collected and combined with the liquid product phase remaining in the reactor and the resulting mixture distilled to give 135 g. of product. Steam distillation of this product gave 34.2 g. of 1,1-dichloro-2-propanone.

We claim:

1. A process for making 1,1-dichloro-2-propanone which comprises reacting by contacting methylacetylene with chlorine at about 50° to 105° C in the presence of liquid water.

2. A process as defined in claim 1 wherein the temperature is between 70° and 105° C.

3. A process as defined in claim 1 wherein the pressure is at least one atmosphere.

4. A process as defined in claim 1 wherein the molar ratio of chlorine to methylacetylene is at least 1:1.

5. A process as defined in claim 1 wherein the methylacetylene is in a gaseous hydrocarbon mixture with any one or more of (1) acetylenics having up to five carbon atoms, (2) olefinics having up to eight carbon atoms or (3) alkanes having up to eight carbon atoms.

6. A process as defined in claim 1 wherein the methylacetylene is in mixture with allene and propane.

7. A process as defined in claim 6 wherein the temperature is 100° C.

* * * * *